(12) United States Patent
Friedman et al.

(10) Patent No.: US 10,802,793 B2
(45) Date of Patent: Oct. 13, 2020

(54) VEHICLE VIRTUAL ASSISTANCE SYSTEMS FOR EXPEDITING A MEAL PREPARING PROCESS

(71) Applicant: Toyota Motor Engineering & Manufacturing North America, Inc., Erlanger, KY (US)

(72) Inventors: Scott A. Friedman, Dallas, TX (US); Prince R. Remegio, Lewisville, TX (US); Tim Uwe Falkenmayer, Mountain View, CA (US); Roger Akira Kyle, Lewisville, TX (US); Ryoma Kakimi, Ann Arbor, MI (US); Luke D. Heide, Plymouth, MI (US); Nishikant Narayan Puranik, Frisco, TX (US)

(73) Assignee: TOYOTA MOTOR ENGINEERING & MANUFACTURING NORTH AMERICA, INC., Plano, TX (US)

( * ) Notice: Subject to any disclaimer, the term of this patent is extended or adjusted under 35 U.S.C. 154(b) by 409 days.

(21) Appl. No.: 15/821,139

(22) Filed: Nov. 22, 2017

(65) Prior Publication Data
US 2019/0155569 A1    May 23, 2019

(51) Int. Cl.
*G06F 16/30* (2019.01)
*G06F 3/16* (2006.01)
(Continued)

(52) U.S. Cl.
CPC ......... *G06F 3/167* (2013.01); *G01C 21/3415* (2013.01); *G01C 21/3484* (2013.01);
(Continued)

(58) Field of Classification Search
CPC ............ G05B 2219/2642; G06F 3/167; G06Q 50/12; G10L 15/22; G10L 2015/223
See application file for complete search history.

(56) References Cited

U.S. PATENT DOCUMENTS 6,711,474 B1 * 3/2004 Treyz ............... G01C 21/26
  701/1
9,541,912 B1 * 1/2017 Grossman, IV ....... G05B 19/02
(Continued)

FOREIGN PATENT DOCUMENTS

JP    2002183162 A    6/2002
JP    2005182699 A    7/2005
(Continued)

OTHER PUBLICATIONS

Transcript of YouTube Video entitled "Introducing the AllRecipes Skill for Amazon Alexa!", by Allrecipes, published on Nov. 18, 2016, available at https://www.youtube.com/watch?v=qpwcPnqhcTE.*
(Continued)

*Primary Examiner* — Mahesh H Dwivedi
(74) *Attorney, Agent, or Firm* — Dinsmore & Shohl LLP (57) ABSTRACT

A vehicle virtual assistance system include one or more processors, one or more memory modules communicatively coupled to the one or more processors, a microphone communicatively coupled to the one or more processors, wherein the microphone receives acoustic vibrations, and machine readable instructions stored in the one or more memory modules. The vehicle virtual assistance system receives, through the microphone, a voice request for a meal from a user of a vehicle, determines a recipe for the meal based on the voice request, retrieve one or more ingredients based on the recipe, locates a store within a predetermined distance from the vehicle, and transmits an instruction related to the one or more ingredients to a store.

19 Claims, 6 Drawing Sheets

(51) Int. Cl.
    *G01C 21/34* (2006.01)
    *G01C 21/36* (2006.01)
    *G06Q 50/12* (2012.01)
    *H04L 12/28* (2006.01)
    *G05B 15/02* (2006.01)
    *G10L 15/22* (2006.01)

(52) U.S. Cl.
    CPC ....... *G01C 21/362* (2013.01); *G01C 21/3667* (2013.01); *G05B 15/02* (2013.01); *G06Q 50/12* (2013.01); *G10L 15/22* (2013.01); *H04L 12/2818* (2013.01); *G10L 2015/223* (2013.01); *H04L 2012/285* (2013.01); *H04L 2012/2841* (2013.01)

(56) References Cited

U.S. PATENT DOCUMENTS

| | | | |
|---|---|---|---|
| 9,715,685 B2 | 7/2017 | Berlin | |
| 10,102,855 B1* | 10/2018 | Sindhwani | G10L 15/22 |
| 2010/0114734 A1* | 5/2010 | Giuli | G06Q 20/12 |
| | | | 705/26.1 |
| 2010/0161149 A1* | 6/2010 | Nguyen | G06F 1/3203 |
| | | | 700/296 |
| 2011/0055044 A1* | 3/2011 | Wiedl | G06Q 30/02 |
| | | | 705/26.5 |
| 2016/0342972 A1* | 11/2016 | Berlin | G06Q 30/00 |
| 2017/0078398 A1 | 3/2017 | Haidar et al. | |
| 2017/0293966 A1* | 10/2017 | Huang | G06Q 10/00 |
| 2019/0012198 A1* | 1/2019 | Ni | G06F 3/167 |
| 2019/0043143 A1* | 2/2019 | Camacho | G06Q 30/0633 |
| 2019/0294128 A1* | 9/2019 | Delaney | G05B 15/02 |

FOREIGN PATENT DOCUMENTS

| | | |
|---|---|---|
| JP | 5972627 B2 | 8/2016 |
| JP | 2017027418 A | 2/2017 |

OTHER PUBLICATIONS

JP2017027418, Published on Feb. 2, 2017, by Ogawa et al.*

* cited by examiner

VEHICLE VIRTUAL ASSISTANCE SYSTEMS FOR EXPEDITING A MEAL PREPARING PROCESS

TECHNICAL FIELD

Embodiments described herein generally relate to vehicle virtual assistance systems and, more specifically, to vehicle virtual assistance systems for expediting a meal preparing process.

BACKGROUND

Occupants in a vehicle may interact with a speech recognition system of the vehicle. The speech recognition system may receive and process speech input and perform various actions based on the speech input. Speech recognition systems may include a number of features accessible to a user of the speech recognition system. However, conventional speech recognition systems do not provide service for saving time to prepare a meal for occupants.

Accordingly, a need exists for a speech recognition system that expedites a meal preparing process.

SUMMARY

In one embodiment, a vehicle virtual assistance system include one or more processors, one or more memory modules communicatively coupled to the one or more processors, a microphone communicatively coupled to the one or more processors, wherein the microphone receives acoustic vibrations, and machine readable instructions stored in the one or more memory modules. The vehicle virtual assistance system receives, through the microphone, a voice request for a meal from a user of a vehicle, determines a recipe for the meal based on the voice request, retrieve one or more ingredients based on the recipe, locates a store within a predetermined distance from the vehicle, and transmits an instruction related to the one or more ingredients to a store.

In another embodiment, a vehicle includes a microphone configured to receive acoustic vibrations, a speaker, and a vehicle virtual assistance system communicatively coupled to the microphone and the speaker. The vehicle virtual assistance system includes one or more processors, one or more memory modules communicatively coupled to the one or more processors, and machine readable instructions stored in the one or more memory modules that cause the vehicle virtual assistance system to perform at least the following when executed by the one or more processors: receive, through the microphone, a voice request for a meal; determine a recipe based on the voice request; retrieve one or more ingredients based on the recipe; locate a store within a predetermined distance from the vehicle; and transmit an instruction related to the one or more ingredients to a store.

In yet another embodiment, a virtual assistance system for a vehicle includes one or more processors, one or more memory modules communicatively coupled to the one or more processors, a microphone communicatively coupled to the one or more processors, wherein the microphone receives acoustic vibrations, and machine readable instructions stored in the one or more memory modules. The vehicle virtual assistance system receives a voice request for a meal, determines a recipe based on the voice request, retrieves one or more ingredients based on the recipe, estimates a cooking time based on the recipe, determines whether a user of the vehicle has time to cook the meal based on the estimated cooking time, and locates a store that sells a prepared meal in response to determining that the user does not have time to cook the meal.

These and additional features provided by the embodiments of the present disclosure will be more fully understood in view of the following detailed description, in conjunction with the drawings.

BRIEF DESCRIPTION OF THE DRAWINGS

The embodiments set forth in the drawings are illustrative and exemplary in nature and not intended to limit the disclosure. The following detailed description of the illustrative embodiments can be understood when read in conjunction with the following drawings, where like structure is indicated with like reference numerals and in which.

DETAILED DESCRIPTION

The embodiments disclosed herein include vehicle virtual assistance systems for expediting a meal preparing process. The vehicle virtual assistance system receives a voice request for a meal, determines a recipe based on the voice request, retrieves one or more ingredients based on the recipe, locates a store within a predetermined distance from a vehicle, and transmits an instruction for ordering the one or more ingredients to a store. The vehicle virtual assistance system provides information about the store so that the user of the vehicle can drive to the store and pick up the required ingredients. In this regard, the user of the vehicle can save time in looking up recipes and ingredients, and shopping for ingredients at a store. Furthermore, the vehicle virtual assistance system determines whether the user of the vehicle has sufficient time to cook the meal given her current schedule, and if there is not sufficient time, the vehicle virtual assistance system suggests ordering a prepared meal, which can save time for cooking. The various vehicle virtual assistance systems for expediting a meal preparing process will be described in more detail herein with specific reference to the corresponding drawings.

Figure 1:
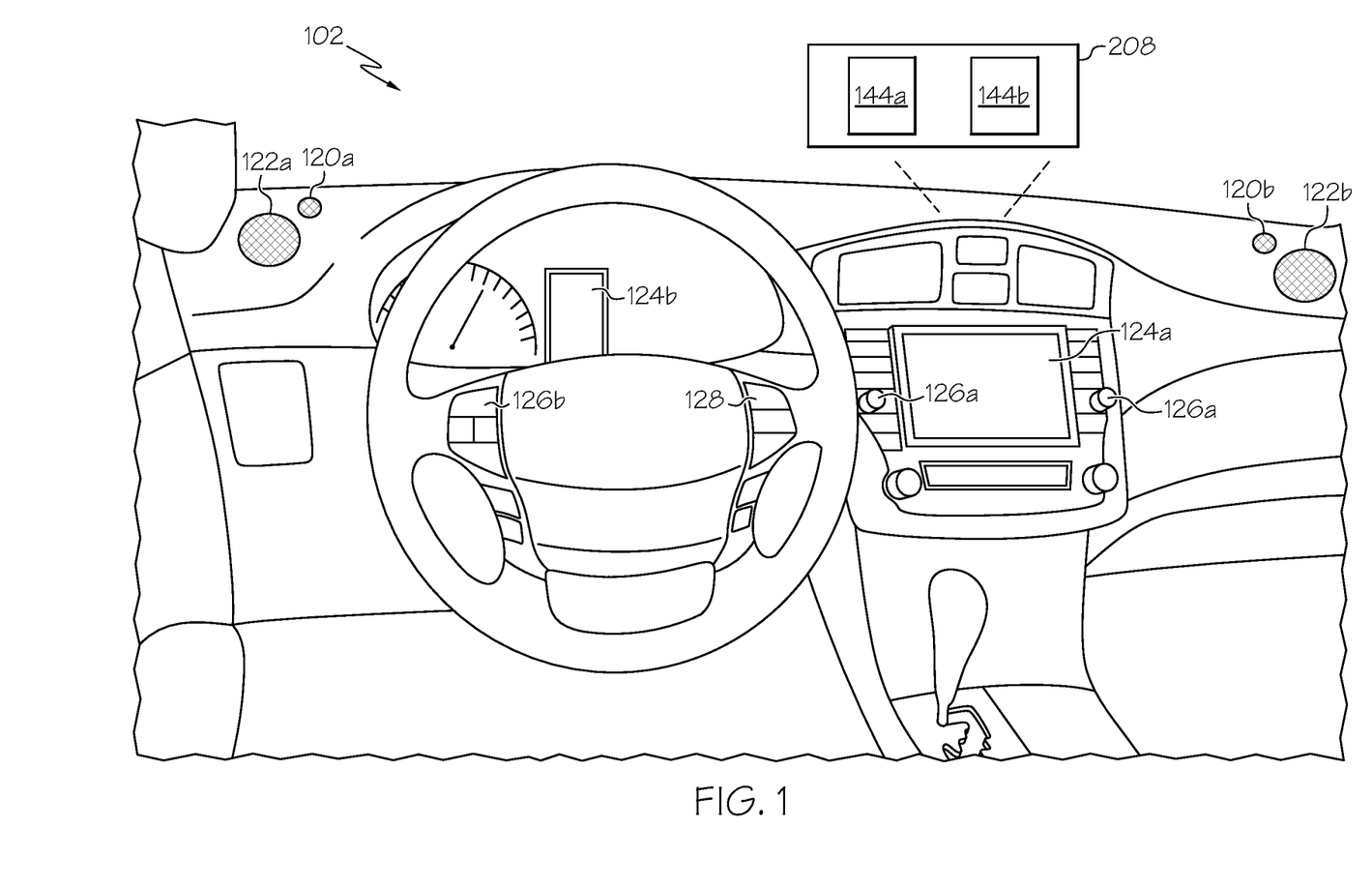
FIG. 1 schematically depicts an interior portion of a vehicle for providing a vehicle virtual assistance system, according to one or more embodiments shown and described herein.

Referring now to the drawings, FIG. 1 schematically depicts an interior portion of a vehicle 102 for providing virtual assistance, according to embodiments disclosed herein. As illustrated, the vehicle 102 may include a number of components that may provide input to or output from the vehicle virtual assistance systems described herein. The interior portion of the vehicle 102 includes a console display 124a and a dash display 124b (referred to independently and/or collectively herein as "display 124"). The console display 124a may be configured to provide one or more user interfaces and may be configured as a touch screen and/or include other features for receiving user input. The dash display 124b may similarly be configured to provide one or more interfaces, but often the data provided in the dash display 124b is a subset of the data provided by the console display 124a. Regardless, at least a portion of the user interfaces depicted and described herein may be provided on either or both the console display 124a and the dash display 124b. The vehicle 102 also includes one or more microphones 120a, 120b (referred to independently and/or collectively herein as "microphone 120") and one or more speakers 122a, 122b (referred to independently and/or collectively herein as "speaker 122"). The one or more microphones 120 may be configured for receiving user voice commands and/or other inputs to the vehicle virtual assistance systems described herein. Similarly, the speakers 122 may be utilized for providing audio content from the vehicle virtual assistance system to the user. The microphone 120, the speaker 122, and/or related components may be part of an in-vehicle audio system. The vehicle 102 also includes tactile input hardware 126a and/or peripheral tactile input 126b for receiving tactile user input, as will be described in further detail below. The vehicle 102 also includes an activation switch 128 for providing an activation input to the vehicle virtual assistance system, as will be described in further detail below.

The vehicle 102 may also include a virtual assistance module 208, which stores voice input analysis logic 144a, and response generation logic 144b. The voice input analysis logic 144a and the response generation logic 144b may include a plurality of different pieces of logic, each of which may be embodied as a computer program, firmware, and/or hardware, as an example. The voice input analysis logic 144a may be configured to execute one or more local speech recognition algorithms on speech input received from the microphone 120, as will be described in further detail below. The response generation logic 144b may be configured to generate responses to the speech input, such as by causing audible sequences to be output by the speaker 122 or causing imagery to be provided to the display 124, as will be described in further detail below.

Figure 2:
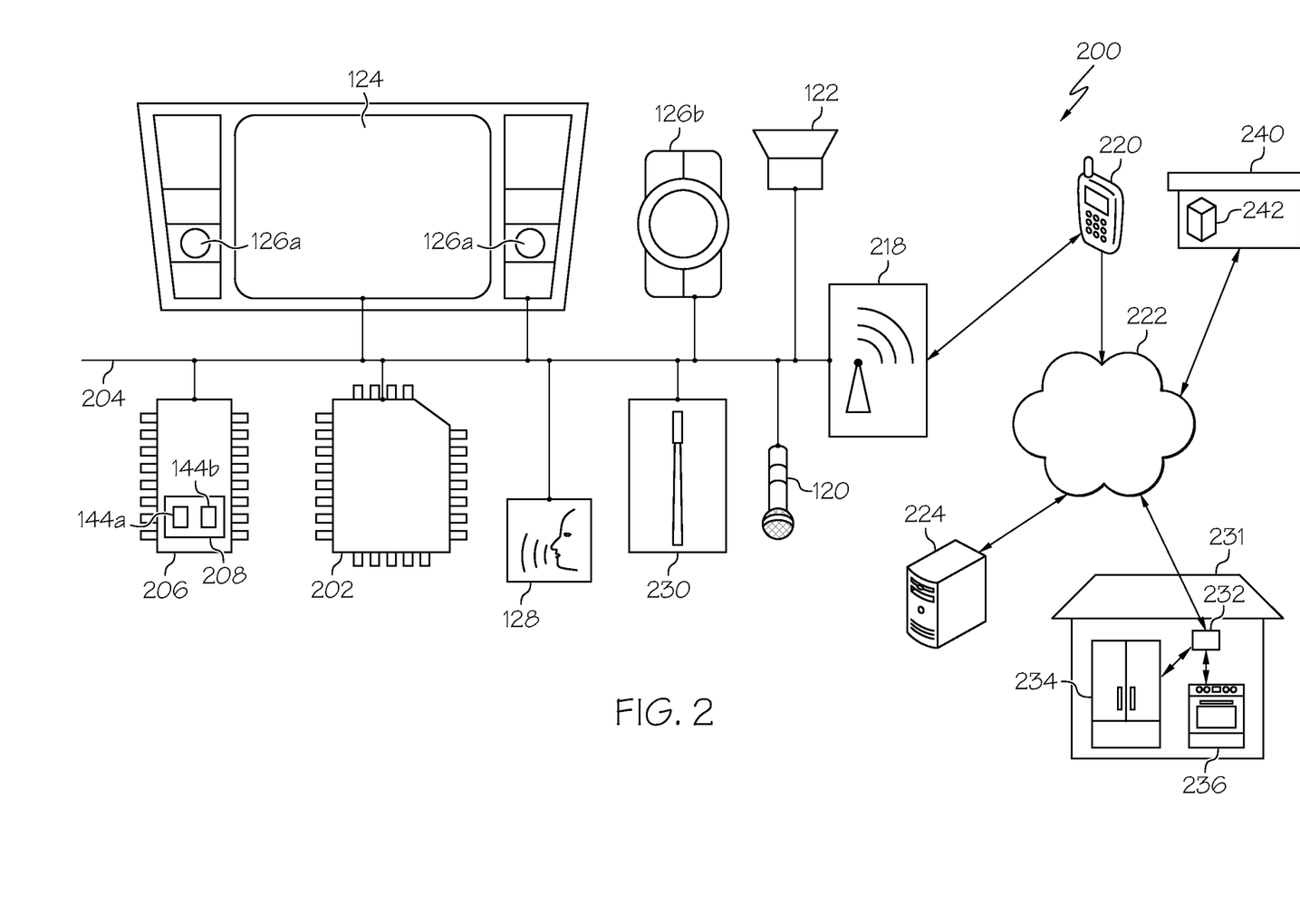
FIG. 2 schematically depicts a speech recognition system, according to one or more embodiments shown and described herein.

Referring now to FIG. 2, an embodiment of a vehicle virtual assistance system 200, including a number of the components depicted in FIG. 1, is schematically depicted. It should be understood that the vehicle virtual assistance system 200 may be integrated with the vehicle 102 or may be embedded within a mobile device (e.g., smartphone, laptop computer, etc.) carried by a driver of the vehicle.

The vehicle virtual assistance system 200 includes one or more processors 202, a communication path 204, one or more memory modules 206, a display 124, a speaker 122, tactile input hardware 126a, a peripheral tactile input 126b, a microphone 120, an activation switch 128, a virtual assistance module 208, network interface hardware 218, and a satellite antenna 230. The various components of the vehicle virtual assistance system 200 and the interaction thereof will be described in detail below.

As noted above, the vehicle virtual assistance system 200 includes the communication path 204. The communication path 204 may be formed from any medium that is capable of transmitting a signal such as, for example, conductive wires, conductive traces, optical waveguides, or the like. Moreover, the communication path 204 may be formed from a combination of mediums capable of transmitting signals. In one embodiment, the communication path 204 comprises a combination of conductive traces, conductive wires, connectors, and buses that cooperate to permit the transmission of electrical data signals to components such as processors, memories, sensors, input devices, output devices, and communication devices. Accordingly, the communication path 204 may comprise a vehicle bus, such as for example a LIN bus, a CAN bus, a VAN bus, and the like. Additionally, it is noted that the term "signal" means a waveform (e.g., electrical, optical, magnetic, mechanical or electromagnetic), such as DC, AC, sinusoidal-wave, triangular-wave, square-wave, vibration, and the like, capable of traveling through a medium. The communication path 204 communicatively couples the various components of the vehicle virtual assistance system 200. As used herein, the term "communicatively coupled" means that coupled components are capable of exchanging data signals with one another such as, for example, electrical signals via conductive medium, electromagnetic signals via air, optical signals via optical waveguides, and the like.

As noted above, the vehicle virtual assistance system 200 includes the one or more processors 202. Each of the one or more processors 202 may be any device capable of executing machine readable instructions. Accordingly, each of the one or more processors 202 may be a controller, an integrated circuit, a microchip, a computer, or any other computing device. The one or more processors 202 are communicatively coupled to the other components of the vehicle virtual assistance system 200 by the communication path 204. Accordingly, the communication path 204 may communicatively couple any number of processors with one another, and allow the modules coupled to the communication path 204 to operate in a distributed computing environment. Specifically, each of the modules may operate as a node that may send and/or receive data.

As noted above, the vehicle virtual assistance system 200 includes the one or more memory modules 206. Each of the one or more memory modules 206 of the vehicle virtual assistance system 200 is coupled to the communication path 204 and communicatively coupled to the one or more processors 202. The one or more memory modules 206 may comprise RAM, ROM, flash memories, hard drives, or any device capable of storing machine readable instructions such that the machine readable instructions may be accessed and executed by the one or more processors 202. The machine readable instructions may comprise logic or algorithm(s) written in any programming language of any generation (e.g., 1GL, 2GL, 3GL, 4GL, or 5GL) such as, for example, machine language that may be directly executed by the processor, or assembly language, object-oriented programming (OOP), scripting languages, microcode, etc., that may be compiled or assembled into machine readable instructions and stored on the one or more memory modules 206. In some embodiments, the machine readable instructions may be written in a hardware description language (HDL), such as logic implemented via either a field-programmable gate array (FPGA) configuration or an application-specific integrated circuit (ASIC), or their equivalents. Accordingly, the methods described herein may be implemented in any conventional computer programming language, as pre-programmed hardware elements, or as a combination of hardware and software components.

In embodiments, the one or more memory modules 206 include the virtual assistance module 208 that processes speech input signals received from the microphone 120 and/or extracts speech information from such signals, as will be described in further detail below. Furthermore, the one or more memory modules 206 include machine readable instructions that, when executed by the one or more processors 202, cause the vehicle virtual assistance system 200 to perform the actions described below. The virtual assistance module 208 includes voice input analysis logic 144a and response generation logic 144b.

The voice input analysis logic 144a and response generation logic 144b may be stored in the one or more memory modules 206. In embodiments, the voice input analysis logic 144a and response generation logic 144b may be stored on, accessed by and/or executed on the one or more processors 202. In embodiments, the voice input analysis logic 144a and response generation logic 144b may be executed on and/or distributed among other processing systems to which the one or more processors 202 are communicatively linked. For example, at least a portion of the voice input analysis logic 144a may be located onboard the vehicle 102. In one or more arrangements, a first portion of the voice input analysis logic 144a may be located onboard the vehicle 102, and a second portion of the voice input analysis logic 144a may be located remotely from the vehicle 102 (e.g., on a cloud-based server, a remote computing system, and/or the one or more processors 202). In some embodiments, the voice input analysis logic 144a may be located remotely from the vehicle 102.

The voice input analysis logic 144a may be implemented as computer readable program code that, when executed by a processor, implement one or more of the various processes described herein. The voice input analysis logic 144a may be a component of one or more processors 202, or the voice input analysis logic 144a may be executed on and/or distributed among other processing systems to which one or more processors 202 is operatively connected. In one or more arrangements, the voice input analysis logic 144a may include artificial or computational intelligence elements, e.g., neural network, fuzzy logic or other machine learning algorithms.

The voice input analysis logic 144a may receive one or more occupant voice inputs from one or more vehicle occupants of the vehicle 102. The one or more occupant voice inputs may include any audial data spoken, uttered, pronounced, exclaimed, vocalized, verbalized, voiced, emitted, articulated, and/or stated aloud by a vehicle occupant. The one or more occupant voice inputs may include one or more letters, one or more words, one or more phrases, one or more sentences, one or more numbers, one or more expressions, and/or one or more paragraphs, etc.

The one or more occupant voice inputs may be sent to, provided to, and/or otherwise made accessible to the voice input analysis logic 144a. The voice input analysis logic 144a may be configured to analyze the occupant voice inputs. The voice input analysis logic 144a may analyze the occupant voice inputs in various ways. For example, the voice input analysis logic 144a may analyze the occupant voice inputs using any known natural language processing system or technique. Natural language processing may include analyzing each user's notes for topics of discussion, deep semantic relationships and keywords. Natural language processing may also include semantics detection and analysis and any other analysis of data including textual data and unstructured data. Semantic analysis may include deep and/or shallow semantic analysis. Natural language processing may also include discourse analysis, machine translation, morphological segmentation, named entity recognition, natural language understanding, optical character recognition, part-of-speech tagging, parsing, relationship extraction, sentence breaking, sentiment analysis, speech recognition, speech segmentation, topic segmentation, word segmentation, stemming and/or word sense disambiguation. Natural language processing may use stochastic, probabilistic and statistical methods.

The voice input analysis logic 144a may analyze the occupant voice inputs to determine whether one or more commands and/or one or more inquiries are included in the occupant voice inputs. A command may be any request to take an action and/or to perform a task. An inquiry includes any questions asked by a user. The voice input analysis logic 144a may analyze the vehicle operational data in real-time or at a later time. As used herein, the term "real time" means a level of processing responsiveness that a user or system senses as sufficiently immediate for a particular process or determination to be made, or that enables the processor to keep up with some external process.

Still referring to FIG. 2, the vehicle virtual assistance system 200 comprises the display 124 for providing visual output such as, for example, information, entertainment, maps, navigation, information, or a combination thereof. The display 124 is coupled to the communication path 204 and communicatively coupled to the one or more processors 202. Accordingly, the communication path 204 communicatively couples the display 124 to other modules of the vehicle virtual assistance system 200. The display 124 may include any medium capable of transmitting an optical output such as, for example, a cathode ray tube, light emitting diodes, a liquid crystal display, a plasma display, or the like. Moreover, the display 124 may be a touchscreen that, in addition to providing optical information, detects the presence and location of a tactile input upon a surface of or adjacent to the display. Accordingly, each display may receive mechanical input directly upon the optical output provided by the display. Additionally, it is noted that the display 124 may include at least one of the one or more processors 202 and the one or memory modules 206. While the vehicle virtual assistance system 200 includes a display 124 in the embodiment depicted in FIG. 2, the vehicle virtual assistance system 200 may not include a display 124 in other embodiments, such as embodiments in which the vehicle virtual assistance system 200 audibly provides outback or feedback via the speaker 122.

As noted above, the vehicle virtual assistance system 200 includes the speaker 122 for transforming data signals from the vehicle virtual assistance system 200 into mechanical vibrations, such as in order to output audible prompts or audible information from the vehicle virtual assistance system 200. The speaker 122 is coupled to the communication path 204 and communicatively coupled to the one or more processors 202.

Still referring to FIG. 2, the vehicle virtual assistance system 200 comprises tactile input hardware 126a coupled to the communication path 204 such that the communication path 204 communicatively couples the tactile input hardware 126a to other modules of the vehicle virtual assistance system 200. The tactile input hardware 126a may be any device capable of transforming mechanical, optical, or electrical signals into a data signal capable of being transmitted with the communication path 204. Specifically, the tactile input hardware 126a may include any number of movable objects that each transform physical motion into a data signal that may be transmitted to over the communication path 204 such as, for example, a button, a switch, a knob, a microphone or the like. In some embodiments, the display 124 and the tactile input hardware 126a are combined as a single module and operate as an audio head unit or an infotainment system. However, it is noted, that the display 124 and the tactile input hardware 126a may be separate from one another and operate as a single module by exchanging signals via the communication path 204. While the vehicle virtual assistance system 200 includes tactile input hardware 126a in the embodiment depicted in FIG. 2, the vehicle virtual assistance system 200 may not include tactile input hardware 126a in other embodiments, such as embodiments that do not include the display 124.

As noted above, the vehicle virtual assistance system 200 optionally comprises the peripheral tactile input 126b coupled to the communication path 204 such that the communication path 204 communicatively couples the peripheral tactile input 126b to other modules of the vehicle virtual assistance system 200. For example, in one embodiment, the peripheral tactile input 126b is located in a vehicle console to provide an additional location for receiving input. The peripheral tactile input 126b operates in a manner substantially similar to the tactile input hardware 126a, i.e., the peripheral tactile input 126b includes movable objects and transforms motion of the movable objects into a data signal that may be transmitted over the communication path 204.

As noted above, the vehicle virtual assistance system 200 comprises the microphone 120 for transforming acoustic vibrations received by the microphone into a speech input signal. The microphone 120 is coupled to the communication path 204 and communicatively coupled to the one or more processors 202. As will be described in further detail below, the one or more processors 202 may process the speech input signals received from the microphone 120 and/or extract speech information from such signals.

Still referring to FIG. 2, the vehicle virtual assistance system 200 comprises the activation switch 128 for activating or interacting with the vehicle virtual assistance system 200. In some embodiments, the activation switch 128 is an electrical switch that generates an activation signal when depressed, such as when the activation switch 128 is depressed by a user when the user desires to utilize or interact with the vehicle virtual assistance system 200. In some embodiments, the vehicle virtual assistance system 200 does not include the activation switch. Instead, when a user says a certain word, the vehicle virtual assistance system 200 becomes ready to recognize words spoken by the user.

As noted above, the vehicle virtual assistance system 200 comprises the microphone 120 for transforming acoustic vibrations received by the microphone into a speech input signal. The microphone 120 is coupled to the communication path 204 and communicatively coupled to the one or more processors 202. As will be described in further detail below, the one or more processors 202 may process the speech input signals received from the microphone 120 and/or extract speech information from such signals.

Still referring to FIG. 2, as noted above, the vehicle virtual assistance system 200 comprises the activation switch 128 for activating or interacting with the vehicle virtual assistance system 200. In some embodiments, the activation switch 128 is an electrical switch that generates an activation signal when depressed, such as when the activation switch 128 is depressed by a user when the user desires to utilize or interact with the vehicle virtual assistance system 200. In some embodiments, the vehicle virtual assistance system 200 does not include the activation switch. Instead, when a user says a certain word (e.g., "agent"), the vehicle virtual assistance system 200 becomes ready to recognize words spoken by the user.

As noted above, the vehicle virtual assistance system 200 includes the network interface hardware 218 for communicatively coupling the vehicle virtual assistance system 200 with a mobile device 220 or a computer network. The network interface hardware 218 is coupled to the communication path 204 such that the communication path 204 communicatively couples the network interface hardware 218 to other modules of the vehicle virtual assistance system 200. The network interface hardware 218 may be any device capable of transmitting and/or receiving data via a wireless network. Accordingly, the network interface hardware 218 may include a communication transceiver for sending and/or receiving data according to any wireless communication standard. For example, the network interface hardware 218 may include a chipset (e.g., antenna, processors, machine readable instructions, etc.) to communicate over wireless computer networks such as, for example, wireless fidelity (Wi-Fi), WiMax, Bluetooth, IrDA, Wireless USB, Z-Wave, ZigBee, or the like. In some embodiments, the network interface hardware 218 includes a Bluetooth transceiver that enables the vehicle virtual assistance system 200 to exchange information with the mobile device 220 (e.g., a smartphone) via Bluetooth communication.

Still referring to FIG. 2, data from various applications running on the mobile device 220 may be provided from the mobile device 220 to the vehicle virtual assistance system 200 via the network interface hardware 218. The mobile device 220 may be any device having hardware (e.g., chipsets, processors, memory, etc.) for communicatively coupling with the network interface hardware 218 and a cellular network 222. Specifically, the mobile device 220 may include an antenna for communicating over one or more of the wireless computer networks described above. Moreover, the mobile device 220 may include a mobile antenna for communicating with the cellular network 222. Accordingly, the mobile antenna may be configured to send and receive data according to a mobile telecommunication standard of any generation (e.g., 1G, 2G, 3G, 4G, 5G, etc.). Specific examples of the mobile device 220 include, but are not limited to, smart phones, tablet devices, e-readers, laptop computers, or the like.

The cellular network 222 generally includes a plurality of base stations that are configured to receive and transmit data according to mobile telecommunication standards. The base stations are further configured to receive and transmit data over wired systems such as public switched telephone network (PSTN) and backhaul networks. The cellular network 222 may further include any network accessible via the backhaul networks such as, for example, wide area networks, metropolitan area networks, the Internet, satellite networks, or the like. Thus, the base stations generally include one or more antennas, transceivers, and processors that execute machine readable instructions to exchange data over various wired and/or wireless networks.

Accordingly, the cellular network 222 may be utilized as a wireless access point by the network interface hardware 218 or the mobile device 220 to access one or more servers (e.g., a server 224). The server 224 generally includes processors, memory, and chipset for delivering resources via the cellular network 222. Resources may include providing, for example, processing, storage, software, and information from the server 224 to the vehicle virtual assistance system 200 via the cellular network 222.

Still referring to FIG. 2, the one or more servers accessible by the vehicle virtual assistance system 200 via the communication link of the mobile device 220 to the cellular network 222 may include third party servers that provide additional speech recognition capability. For example, the server 224 may include speech recognition algorithms capable of recognizing more words than the local speech recognition algorithms stored in the one or more memory modules 206. It should be understood that the network interface hardware 218 or the mobile device 220 may be communicatively coupled to any number of servers by way of the cellular network 222.

The network interface hardware 218 may be communicatively coupled to the cellular network 222 and may communicate with the smart home server 232 and the store server 242 via the cellular network 222. The vehicle virtual assistance system 200 may send out instructions to the smart home server 232 and/or the store server 242 via the cellular network 222. For example, the network interface hardware 218 transmits instructions for operating smart devices (e.g., a smart refrigerator 234, a smart oven 236, etc.) to the smart home server 232 via the cellular network 222. As another example, the network interface hardware 218 transmits instructions for ordering products to the store server 242 via the cellular network 222.

As noted above, the vehicle virtual assistance system 200 optionally includes a satellite antenna 230 coupled to the communication path 204 such that the communication path 204 communicatively couples the satellite antenna 230 to other modules of the vehicle virtual assistance system 200. The satellite antenna 230 is configured to receive signals from global positioning system satellites. Specifically, in one embodiment, the satellite antenna 230 includes one or more conductive elements that interact with electromagnetic signals transmitted by global positioning system satellites. The received signal is transformed into a data signal indicative of the location (e.g., latitude and longitude) of the satellite antenna 230 or an object positioned near the satellite antenna 230, by the one or more processors 202.

Additionally, it is noted that the satellite antenna 230 may include at least one of the one or more processors 202 and the one or memory modules 206. In embodiments where the vehicle virtual assistance system 200 is coupled to a vehicle, the one or more processors 202 execute machine readable instructions to transform the global positioning satellite signals received by the satellite antenna 230 into data indicative of the current location of the vehicle. While the vehicle virtual assistance system 200 includes the satellite antenna 230 in the embodiment depicted in FIG. 2, the vehicle virtual assistance system 200 may not include the satellite antenna 230 in other embodiments, such as embodiments in which the vehicle virtual assistance system 200 does not utilize global positioning satellite information or embodiments in which the vehicle virtual assistance system 200 obtains global positioning satellite information from the mobile device 220 via the network interface hardware 218.

Still referring to FIG. 2, it should be understood that the vehicle virtual assistance system 200 may be formed from a plurality of modular units, i.e., the display 124, the speaker 122, tactile input hardware 126*a*, the peripheral tactile input 126*b*, the microphone 120, the activation switch 128, etc. may be formed as modules that when communicatively coupled form the vehicle virtual assistance system 200. Accordingly, in some embodiments, each of the modules may include at least one of the one or more processors 202 and/or the one or more memory modules 206. Accordingly, it is noted that, while specific modules may be described herein as including a processor and/or a memory module, the embodiments described herein may be implemented with the processors and memory modules distributed throughout various communicatively coupled modules.

Figure 3:
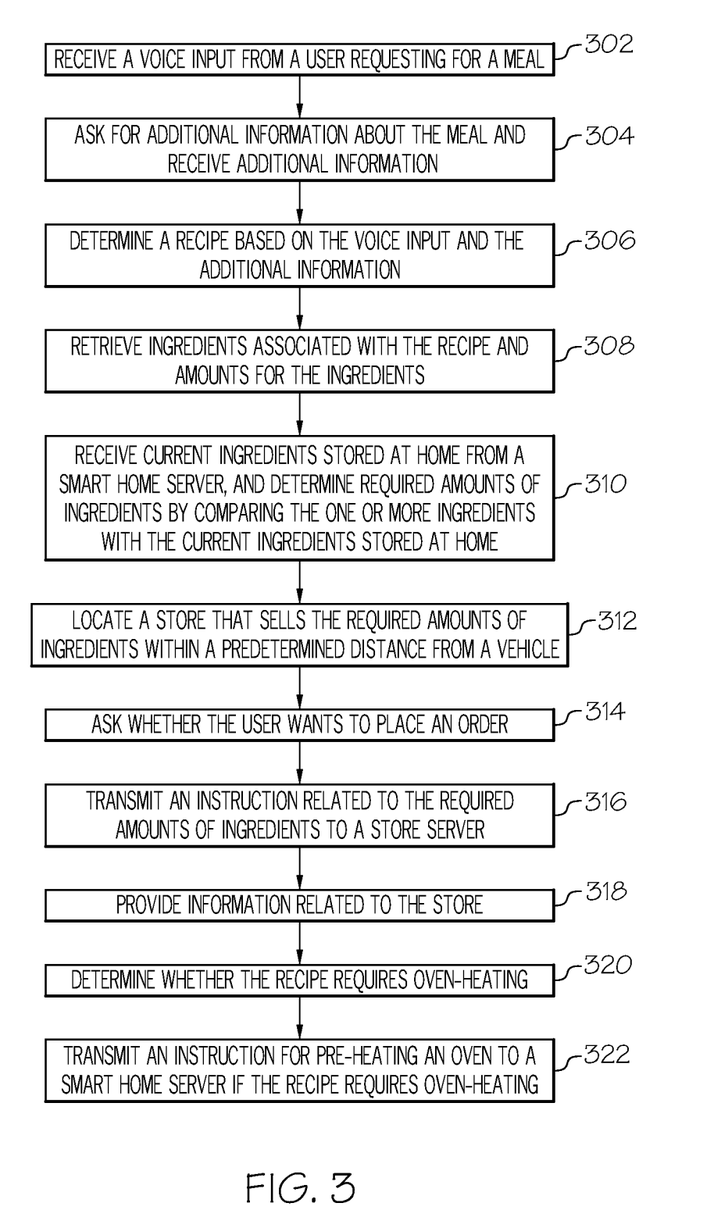
FIG. 3 depicts a flowchart for preparing a meal in response to a voice request for the meal, according to one or more embodiments shown and described herein.

FIG. 3 depicts a flowchart for preparing a meal in response to a voice request for the meal. In block 302, the vehicle virtual assistance system 200 receives a voice input from a user requesting for a meal through the microphone 120. For example, the vehicle virtual assistance system 200 receives a vocal statement "I want Pad Thai for my dinner" from a user through the microphone 120. The voice input analysis logic 144*a* may analyze the vocal statement and identify "Pad Thai" as a requested meal.

Figure 4:
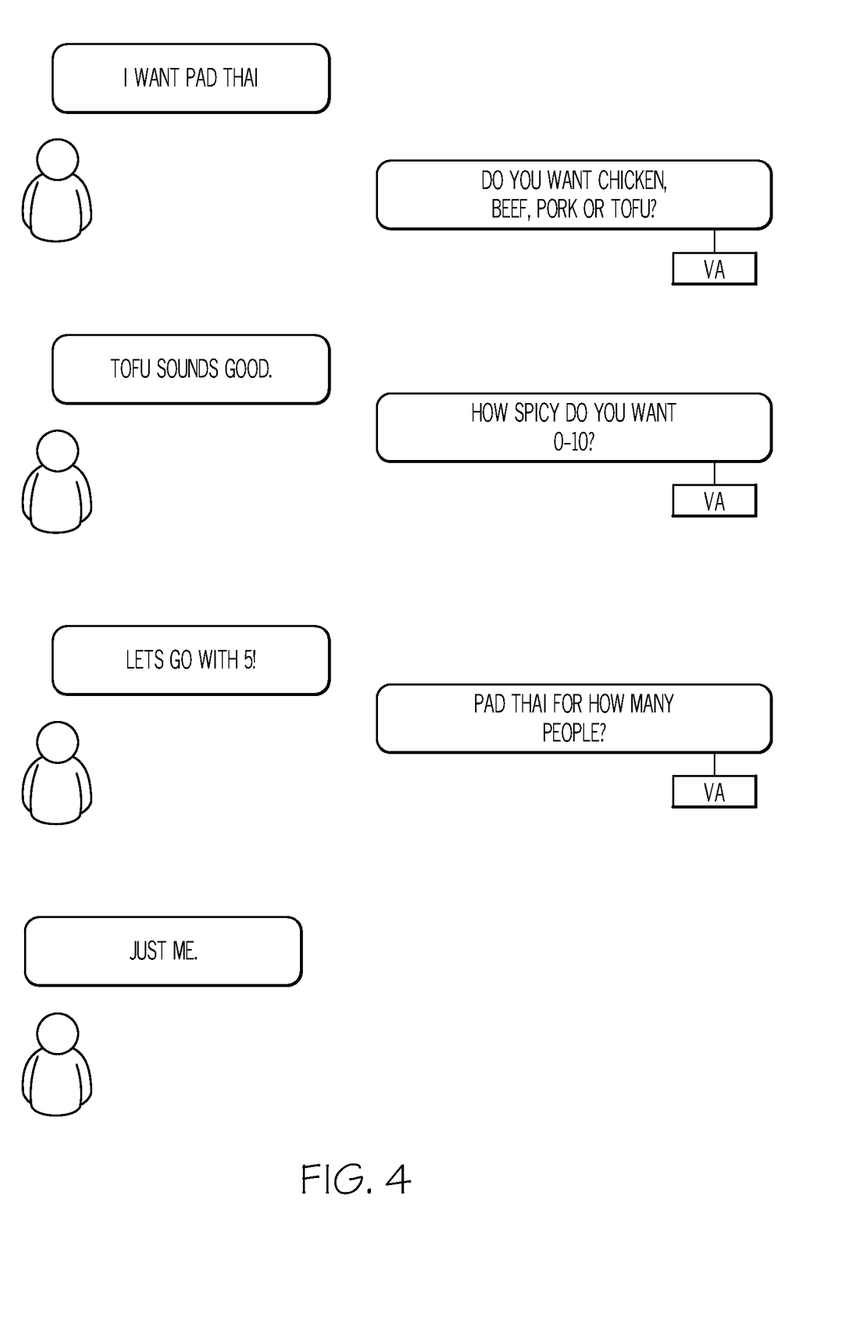
FIG. 4 depicts an interaction between a user and a vehicle virtual assistance system, according to one or more embodiments shown and described herein.

In block 304, the vehicle virtual assistance system 200 may ask for additional information about the requested meal and receive the additional information from the user. For example, as shown in FIG. 4, in response to a statement "I want Pad Thai," the response generation logic 144*b* creates a statement asking the kind of protein to be included in Pad Thai, e.g., "Do you want chicken, beef, pork, or tofu?" and the vehicle virtual assistance system 200 outputs the statement through the speaker 122. In some embodiments, the vehicle virtual assistance system 200 may display images or texts of chicken, beef, pork and tofu on the console display 124*a*.

The vehicle virtual assistance system 200 may receive an answer from the user, e.g., "Tofu sounds good," through the microphone 120. The voice input analysis logic 144*a* may analyze the answer, identify "tofu," and store tofu as ingredients. In some embodiments, the vehicle virtual assistance system 200 receives a selection of one of the images or texts displayed on the console display 124*a*. For example, a user may select one of the displayed images on the console display 124*a* by touching on the console display 124*a* or manipulating the tactile input hardware 126*a* and/or peripheral tactile input 126*b*.

The vehicle virtual assistance system 200 may ask further questions. For example, the response generation logic 144*b* creates a statement, such as "How spicy do you want 0-10?" Then, the vehicle virtual assistance system 200 receives an answer from the user, e.g., "Let's go with 5," through the microphone 120. The voice input analysis logic 144*a* may analyze the answer and store 5 as a level of spiciness. As another example, the response generation logic 144*b* may create a query, e.g., "Pad Thai for how many people?" The vehicle virtual assistance system 200 outputs the query through the speaker 122. Then, the vehicle virtual assistance system 200 receives an answer from the user, e.g., "Just me," through the microphone 120. The voice input analysis logic 144*a* may analyze the answer, and store one as the number of people to server. In some embodiments, the vehicle virtual assistance system 200 may display numbers on the console display 124*a*. A user may select one of the numbers displayed on the console display 124*a* by touching on the console display 124*a* or manipulating the tactile input hardware 126*a* and/or peripheral tactile input 126*b*.

In block 306, the vehicle virtual assistance system 200 determines a recipe based on the voice input and/or the additional information received in block 304. In embodiments, the vehicle virtual assistance system 200 may retrieve a recipe from the one or more memory modules 206 that matches the requested meal. In some embodiments, the vehicle virtual assistance system 200 may retrieve a recipe stored in the mobile device 220 by accessing the mobile device 220. In some embodiments, the vehicle virtual assistance system 200 may access the internet through the cellular network 222 and retrieve a recipe for the requested meal by searching on the internet.

In block 308, the vehicle virtual assistance system 200 retrieves ingredients associated with the retrieved recipe and amounts for the ingredients. For example, the retrieved recipe for Pad Thai may include a 4 ounces fettuccine-width rice stick noodles, ¼ cup fish sauce, ½ pound tofu, 1 cup bean sprouts, 2 eggs, ¼ cup chopped scallions, ¼ cup peanut oil, ½ cup roasted peanuts, etc.

In block 310, the vehicle virtual assistance system 200 may receive current ingredients stored at the house of the user from a smart home server and determine required amounts of ingredients by comparing the retrieved ingredients with the current ingredients stored at the house. For example, if the current ingredients stored at the house include more than 2 eggs, the vehicle virtual assistance system 200 may remove eggs from the list of required amounts of ingredients.

In block 312, the vehicle virtual assistance system 200 may locate a store that sells the required amounts of ingredients within a predetermined distance from a vehicle. The vehicle virtual assistance system 200 may identify the current location of the vehicle 102 using the satellite antenna 230 and locate a store that sells the requirement amounts of ingredients within the predetermined distance from the vehicle. For example, the vehicle virtual assistance system 200 searches a grocery store that is closest to the vehicle and that sells the required amounts of the ingredients by accessing the internet through the cellular network 222. In some embodiments, the vehicle virtual assistance system 200 may communicate with the store server of the searched grocery store to determine whether the grocery store sells the requirement amounts of the ingredients.

In block 314, the vehicle virtual assistance system 200 outputs a voice asking whether the user wants to place an order for the requirement amounts of ingredients at the located store. For example, the vehicle virtual assistance system 200 may output a voice saying "Do you want to place an order for the ingredients for Pad Thai? Total will be $8.50."

Figure 5:
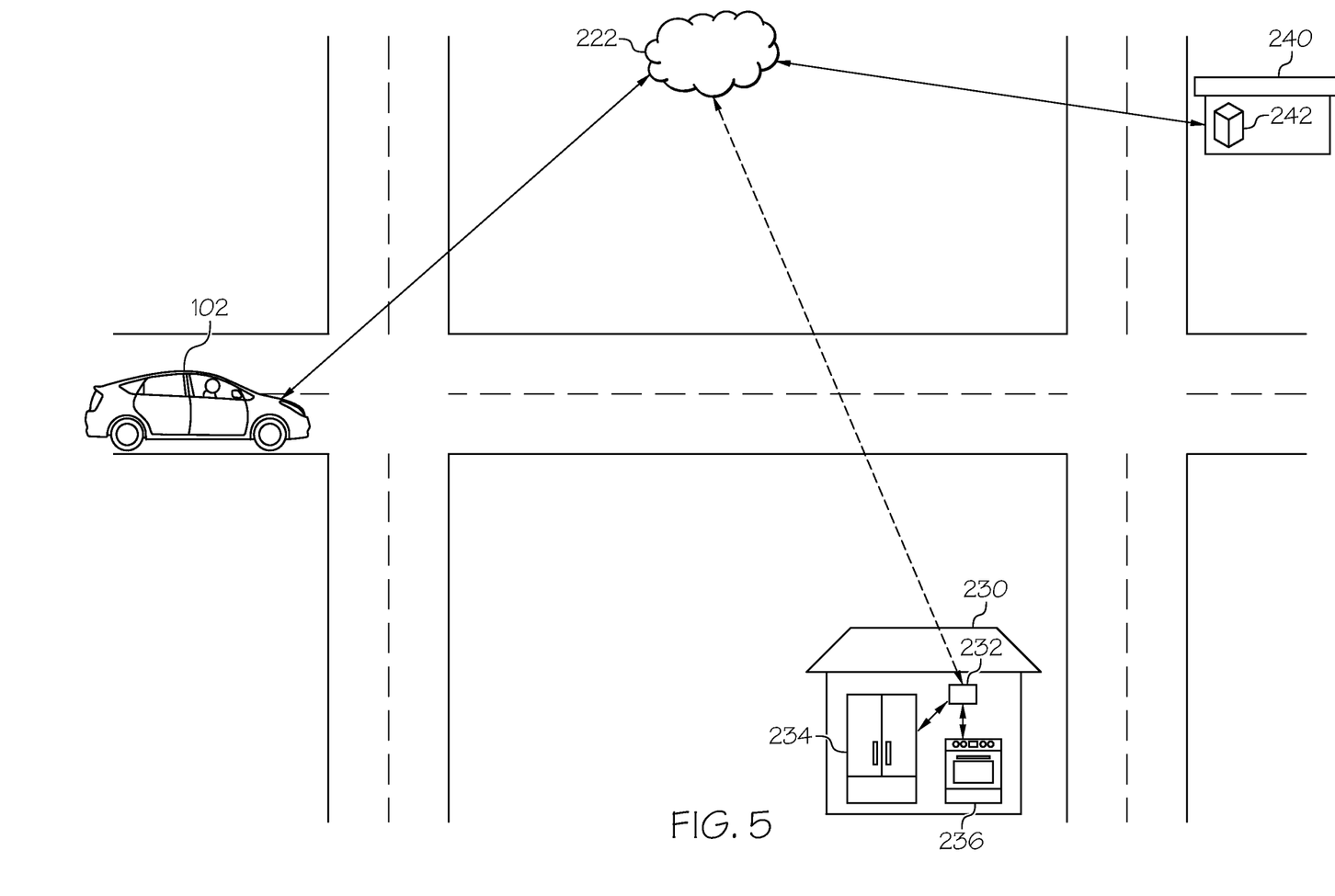
FIG. 5 depicts a vehicle virtual assistance system communicating with a store server and a smart home server, according to one or more embodiments shown and described herein.

In block 316, the vehicle virtual assistance system 200 transmits an instruction related to the required amounts of ingredients to a store server in response to receiving confirmation of the order from the user. For example, the vehicle virtual assistance system 200 may transmit instructions for ordering the required amounts of the ingredients to the store server 242 including 4 ounces fettuccine-width rice stick noodles, ¼ cup fish sauce, ½ pound tofu, 1 cup bean sprouts, 2 eggs, ¼ cup chopped scallions, ¼ cup peanut oil, ½ cup roasted peanuts as shown in FIG. 5.

In block 318, the vehicle virtual assistance system 200 provides information related to the store. In embodiments, the vehicle virtual assistance system 200 may notify the location of the store 240 to the user. For example, the vehicle virtual assistance system 200 may display a route to the store 240 on the display 124 such that a driver may drive to the store. As another example, the vehicle virtual assistance system 200 may output, through the speaker 122, a voice "I ordered the required ingredients to XYZ store on main street, they are ready to pick up in 10 minutes," such that a driver may drive to the XYZ store.

In block 320, the vehicle virtual assistance system 200 determines whether the recipe requires pre-operation of home appliances (e.g., pre-heating of an oven). For example, if the recipe includes setting an oven temperature at 400 Fahrenheit degrees, the vehicle virtual assistance system 200 determines that the recipe requires oven-heating based on the present of the heating temperature in the recipe.

In block 322, the vehicle virtual assistance system 200 transmits an instruction for pre-heating the smart oven 236 to the smart home server 232 in response to determining that the recipe requires oven-heating. For example, as shown in FIG. 5, the vehicle virtual assistance system 200 transmits an instruction for pre-heating the smart oven 236 to the smart home server 232 via the cellular network 222. In some embodiments, the vehicle virtual assistance system 200 may determine the timing of sending the instruction for pre-heating based on the required time of pre-heating.

For example, if the pre-heating takes about 6 minutes to be heated up to the required temperature (e.g., 425 Fahrenheit degrees) of the recipe, the vehicle virtual assistance system 200 may monitor the time to arrive the house 231 and transmit the instruction for pre-heating to the smart home server 232 when it determines that it takes six minutes to arrive the house 231. The time of pre-heating up to a certain temperature may be pre-stored in the smart home server 232. For example, the smart home server 232 may store 3 minutes for 350 Fahrenheit degrees, 4 minute for 375 Fahrenheit degrees, 5 minutes for 400 Fahrenheit degrees, and 6 minutes for 425 Fahrenheit degrees. In some embodiments, the vehicle virtual assistance system 200 may transmit the recipe determined in block 306 to the smart home server 232, such that the smart home server 232 transmits the recipe to the smart home appliances (e.g., the smart refrigerator 234 and the smart oven 236). The smart refrigerator 234 or the smart oven 236 may display the received recipe on its screen, such that the user can look at the recipe when she arrives at the house 231.

Figure 6:
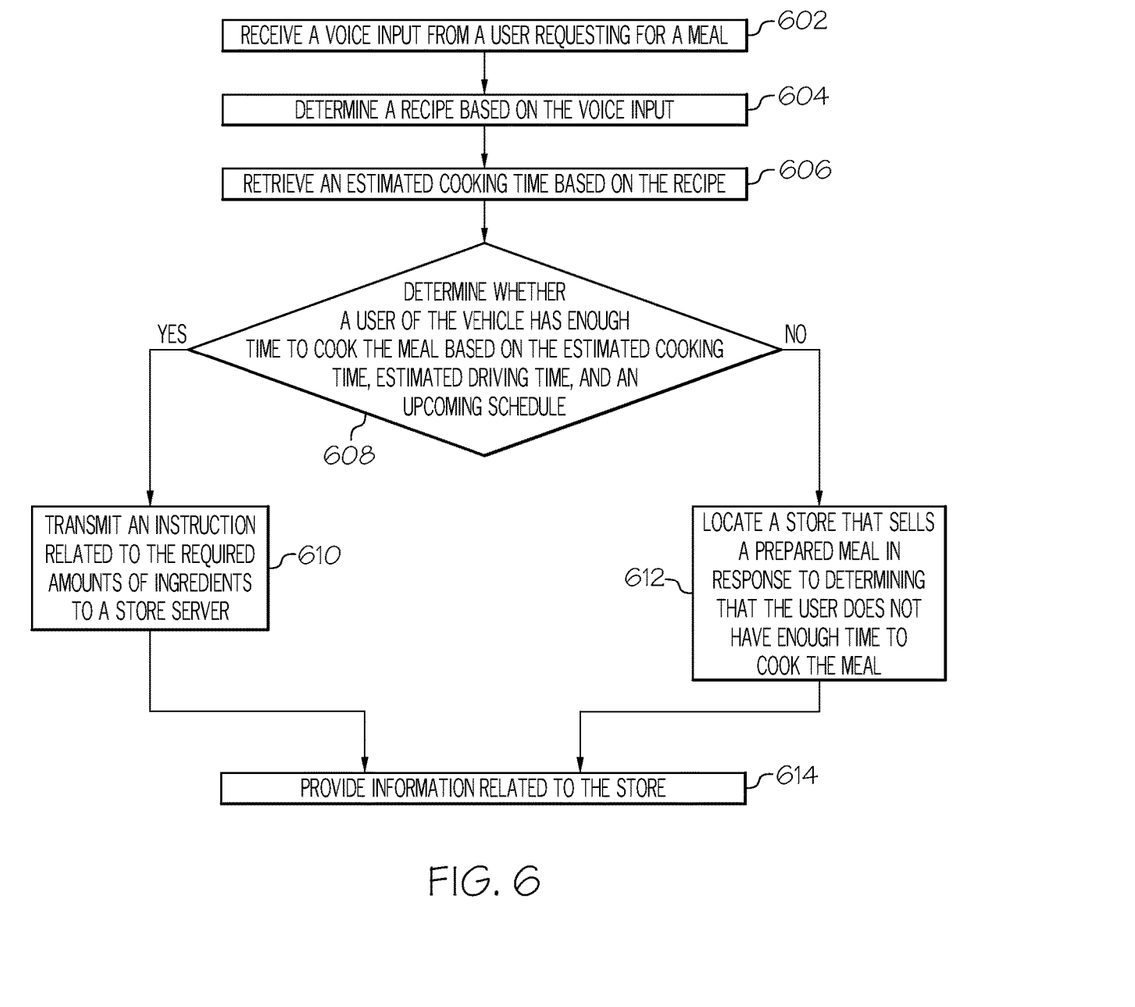
FIG. 6 depicts a flowchart for preparing a meal in response to a voice request for the meal, according to another embodiment shown and described herein.

FIG. 6 depicts a flowchart for preparing a meal in response to a voice request for the meal, according to another embodiment. In block 602, the vehicle virtual assistance system 200 receives a voice input from a user requesting for a meal through the microphone 120. For example, the vehicle virtual assistance system 200 receives a vocal statement "I want Lasagna for my dinner" from the user through the microphone 120. The voice input analysis logic 144a analyzes the vocal statement and identifies "Lasagna" as a requested meal for dinner.

In block 604, the vehicle virtual assistance system 200 determines a recipe based on the voice input. In embodiments, the vehicle virtual assistance system 200 may retrieve a recipe from the one or more memory modules 206 that matches the requested meal. In some embodiments, the vehicle virtual assistance system 200 may retrieve a recipe stored in the mobile device 220 by accessing the mobile device 220. In some embodiments, the vehicle virtual assistance system 200 may access the internet through the cellular network 222 and retrieve a recipe for the requested meal by searching on the internet.

In block 606, the vehicle virtual assistance system 200 retrieves an estimated cooking time based on the recipe. In embodiments, the recipe includes an estimated cooking time and the vehicle virtual assistance system 200 retrieves the estimated cooking time from the recipe. In some embodiments, the one or more memory modules 206 store estimated cooking time for each of recipes, and the vehicle virtual assistance system 200 retrieves an estimated cooking time for the determined recipe.

In block 608, the vehicle virtual assistance system 200 determines whether a user of the vehicle has enough time to cook the meal based on the estimated cooking time, estimated driving time, and an upcoming schedule. In embodiments, the estimated driving may be a total of an estimated driving time from a current location to a grocery store where the driver is to pick up ingredients and an estimated driving time from the grocery store to the driver's house. The estimated driving time may be determined based on a distance and real-time traffic information received from the cellular network 222. In embodiments, the one or more memory modules 206 may include calendar data for the user of the vehicle including upcoming events. For example, the calendar data may include "a meeting with John at 7:30 pm." In some embodiments, the vehicle virtual assistance system 200 may retrieve calendar data from the mobile device 220 which stores the calendar data for the user. Based on the estimated cooking time, the estimated driving time, and the upcoming schedule, the vehicle virtual assistance system 200 determines whether the user have enough time to cook. For example, if the current time is 6:30 pm, the estimated cooking time is 60 minutes, the estimated driving time is 20 minutes, and the upcoming event is at 7:30, then the vehicle virtual assistance system 200 may determine that the user does not have enough time to cook the meal because of the conflicting upcoming event.

In block 610, the vehicle virtual assistance system 200 transmits an instruction related to the required amounts of ingredients to a store server in response to determining that a user of the vehicle has enough time to cook the meal. For example, the vehicle virtual assistance system 200 may transmit instructions for ordering the required amounts of the ingredients to the store server 242.

In block 612, the vehicle virtual assistance system 200 locates a store that sells a prepared meal in response to determining that the user does not have enough time to cook the meal. In embodiments, the vehicle virtual assistance system 200 may locate a store that sells a prepared meal (e.g., for example, a frozen food that takes less than 5 minutes to microwave) by searching on the internet through the cellular network 222. The vehicle virtual assistance system 200 may communicate with store servers of grocery stores within a certain distance to determine whether any of the grocery stores sell a prepared meal. Then, the response generation logic 144b of the vehicle virtual assistance system 200 may create a statement, e.g., "Do you want to place an order for a frozen Lasagna? Total will be $5.50." The vehicle virtual assistance system 200 may output the statement through the speaker 122. The vehicle virtual assistance system 200 transmits an instruction for ordering the prepared meal to the store server of the store that sells the prepared meal in response to the confirmation of the order by the user. In some embodiments, the vehicle virtual assistance system 200 may look up previous transaction history stored in the one or more memory modules 206 and order the same prepared meal that the user had ordered previously.

In block 614, the vehicle virtual assistance system 200 provides information related to the store. In embodiments, the vehicle virtual assistance system 200 may notify the location of the store 240 to the user. For example, the vehicle virtual assistance system 200 may display a route to the store 240 on the display 124 such that a driver may drive to the store 240. As another example, the vehicle virtual assistance system 200 may output "I ordered the required ingredients to XYZ store on main street, they are ready to pick up in 10 minutes," such that a driver may drive to the XYZ store.

It should be understood that embodiments described herein provide for vehicle virtual assistance systems for expediting a meal preparing process. The vehicle virtual assistance system receives a voice request for a meal, determines a recipe based on the voice request, retrieves one or more ingredients based on the recipe, locates a store within a predetermined distance from a vehicle, and transmits an instruction for ordering the one or more ingredients to a store. The vehicle virtual assistance system provides information about the store so that the user of the vehicle can drive to the store and pick up the required ingredients. In this regard, the user of the vehicle can save time in looking up for recipes, ingredients, and shopping for ingredients. Furthermore, the vehicle virtual assistance system determines whether the user of the vehicle has sufficient time to cook the meal given her current schedule, and if there is no sufficient time, the vehicle virtual assistance system suggests ordering a prepared meal, which can save time for cooking.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A vehicle virtual assistance system comprising:
   one or more processors;
   one or more memory modules;
   a microphone communicatively coupled to the one or more processors; and
   machine readable instructions stored in the one or more memory modules that cause the vehicle virtual assistance system to perform at least the following when executed by the one or more processors:
   receive, through the microphone, a voice request for a meal from a user of a vehicle;
   determine a recipe for the meal based on the voice request;
   retrieve one or more ingredients based on the recipe;
   locate a store within a predetermined distance from the vehicle;
   determine whether the user of the vehicle has time to cook the meal based on estimated cooking time for the meal, estimated driving time from a current location to the store, estimated driving time from the store to a house, and calendar data related to the user; and
   transmit an instruction related to the one or more ingredients to the store in response to determining that the user of the vehicle has time to cook.

2. The vehicle virtual assistance system of claim 1, wherein the machine readable instructions stored in the one or more memory modules cause the vehicle virtual assistance system to perform at least the following when executed by the one or more processors:
   ask additional information related to the meal;
   receive the additional information related to the meal; and
   retrieve the one or more ingredients based on the recipe and the additional information.

3. The vehicle virtual assistance system of claim 1, wherein the machine readable instructions stored in the one or more memory modules cause the vehicle virtual assistance system to perform at least the following when executed by the one or more processors:
   receive, from a smart home server, a list of current ingredients stored at the house associated with the user;
   determine required amounts of ingredients by comparing the retrieved one or more ingredients with the list of current ingredients; and
   transmit an instruction ordering the required amounts of ingredients to the store.

4. The vehicle virtual assistance system of claim 1, wherein the machine readable instructions stored in the one or more memory modules cause the vehicle virtual assistance system to perform at least the following when executed by the one or more processors:
   provide information related to the store.

5. The vehicle virtual assistance system of claim 4, further comprising a display, wherein the machine readable instructions stored in the one or more memory modules cause the vehicle virtual assistance system to perform at least the following when executed by the one or more processors:
display a route to the store on a screen of the vehicle.

6. The vehicle virtual assistance system of claim 1, wherein the machine readable instructions stored in the one or more memory modules cause the vehicle virtual assistance system to perform at least the following when executed by the one or more processors:
determine whether the recipe requires a pre-operation of a home appliance at the house; and
transmit an instruction for operating the home appliance to a smart home server for the house in response to determining that the recipe requires the pre-operation of the home appliance.

7. The vehicle virtual assistance system of claim 6, wherein the home appliance is an oven, wherein the machine readable instructions stored in the one or more memory modules cause the vehicle virtual assistance system to perform at least the following when executed by the one or more processors:
determine whether the recipe requires the pre-operation of the oven at the house based on a presence of a heating temperature in the recipe.

8. The vehicle virtual assistance system of claim 6, wherein the machine readable instructions stored in the one or more memory modules cause the vehicle virtual assistance system to perform at least the following when executed by the one or more processors:
determine a time for pre-operating the home appliance;
determine a time to arrive the house; and
transmit the instruction for operating the home appliance based on the time for pre-operating the home appliance and the time to arrive at the house.

9. The vehicle virtual assistance system of claim 1, further comprising a screen, wherein the machine readable instructions stored in the one or more memory modules cause the vehicle virtual assistance system to perform at least the following when executed by the one or more processors:
determine the recipe for the meal based on the voice request by retrieving the recipe from the one or more memory modules.

10. The vehicle virtual assistance system of claim 1, further comprising a screen, wherein the machine readable instructions stored in the one or more memory modules cause the vehicle virtual assistance system to perform at least the following when executed by the one or more processors:
determine the recipe for the meal based on the voice request by retrieving the recipe from a mobile device communicatively coupled to the vehicle virtual assistance system.

11. A vehicle comprising:
a microphone configured to receive acoustic vibrations; and
a vehicle virtual assistance system communicatively coupled to the microphone, comprising:
one or more processors;
one or more memory modules communicatively coupled to the one or more processors; and
machine readable instructions stored in the one or more memory modules that cause the vehicle virtual assistance system to perform at least the following when executed by the one or more processors:
receive, through the microphone, a voice request for a meal;
determine a recipe based on the voice request;
retrieve one or more ingredients based on the recipe;
locate a store within a predetermined distance from the vehicle;
determine whether a user of the vehicle has time to cook the meal based on estimated cooking time for the meal, estimated driving time from a current location to the store, estimated driving time from the store to a house, and calendar data related to the user; and
transmit an instruction for ordering the one or more ingredients to the store in response to determining that the user of the vehicle has time to cook.

12. The vehicle of claim 11, wherein the machine readable instructions stored in the one or more memory modules cause the vehicle virtual assistance system to perform at least the following when executed by the one or more processors:
ask for additional information about the meal;
receive the additional information about the meal; and
retrieve the one or more ingredients based on the recipe and the additional information.

13. The vehicle of claim 11, wherein the machine readable instructions stored in the one or more memory modules cause the vehicle virtual assistance system to perform at least the following when executed by the one or more processors:
receive, from a smart home server, current ingredients stored at the house of the user;
determine required amounts of ingredients by comparing the retrieved one or more ingredients with the current ingredients; and
transmit an instruction for ordering the required amounts of ingredients to the store.

14. The vehicle of claim 11, further comprising a screen, wherein the machine readable instructions stored in the one or more memory modules cause the vehicle virtual assistance system to perform at least the following when executed by the one or more processors:
display a route to the store on the screen in response to transmitting the instruction for ordering the one or more ingredients to the store.

15. The vehicle of claim 11, wherein the machine readable instructions stored in the one or more memory modules cause the vehicle virtual assistance system to perform at least the following when executed by the one or more processors:
determine whether the recipe requires a pre-operation of a home appliance at the house; and
transmit an instruction for operating the home appliance in response to determining that the recipe requires the pre-operation of the home appliance.

16. The vehicle of claim 15, wherein the home appliance is an oven, wherein the machine readable instructions stored in the one or more memory modules cause the vehicle virtual assistance system to perform at least the following when executed by the one or more processors:
determine whether the recipe requires the pre-operation of the oven at the house based on a presence of a heating temperature in the recipe.

17. The vehicle of claim 15, wherein the machine readable instructions stored in the one or more memory modules cause the vehicle virtual assistance system to perform at least the following when executed by the one or more processors:

determine a time for pre-operating the home appliance;
determine a time to arrive the house; and
transmit the instruction for operating the home appliance based on the time for pre-operating the home appliance and the time to arrive at the house.

18. A virtual assistance system for a vehicle, comprising:
one or more processors;
one or more memory modules communicatively coupled to the one or more processors;
a microphone communicatively coupled to the one or more processors, wherein the microphone receives acoustic vibrations; and
machine readable instructions stored in the one or more memory modules that cause the virtual assistance system to perform at least the following when executed by the one or more processors:
receive a voice request for a meal;
determine a recipe based on the voice request;
retrieve one or more ingredients based on the recipe;
estimate a cooking time based on the recipe;
estimate a driving time from a current location to a store that sells the one or more ingredients;
estimate a driving time from the store to a house of a user;
retrieve calendar data related to the user;
determine whether the user of the vehicle has time to cook the meal based on the estimated cooking time, the estimated driving time form the current location to the store, the estimated driving time from the store to the house, and the calendar data; and
locate a store that sells a prepared meal in response to determining that the user does not have time to cook the meal.

19. The virtual assistance system of claim 18, wherein the machine readable instructions stored in the one or more memory modules cause the virtual assistance system to perform at least the following when executed by the one or more processors:
in response to determining that the user has time to cook the meal:
determine whether the recipe requires a pre-operation of a home appliance at the house; and
transmit an instruction for operating the home appliance in response to determining that the recipe requires the pre-operation of the home appliance.

* * * * *

UNITED STATES PATENT AND TRADEMARK OFFICE
CERTIFICATE OF CORRECTION

PATENT NO.       : 10,802,793 B2
APPLICATION NO.  : 15/821139
DATED            : October 13, 2020
INVENTOR(S)      : Scott A. Friedman et al.

Page 1 of 1

It is certified that error appears in the above-identified patent and that said Letters Patent is hereby corrected as shown below:

In the Specification

In Column 12, Line(s) 14, delete "minute" and insert --minutes--, therefor.

Signed and Sealed this
Eighth Day of December, 2020

Andrei Iancu
*Director of the United States Patent and Trademark Office*